United States Patent [19]

Holcomb et al.

[11] Patent Number: 4,502,727
[45] Date of Patent: Mar. 5, 1985

[54] PIVOT MOUNTED CYCLE SEAT WITH SPRING CRADLE

[75] Inventors: Stephen A. Holcomb, 3945 Cherry Hill Rd., Knollwood Village, Santa Maria, Calif. 53455; Johnny E. Aker, 1480 Adelia Ave., South El Monte, Calif. 91733

[73] Assignee: Stephen A. Holcomb, Santa Maria, Calif.

[21] Appl. No.: 397,608

[22] Filed: Jul. 12, 1982

[51] Int. Cl.³ .................................................. B62J 1/00
[52] U.S. Cl. ...................................... 297/209; 297/195; 297/302; 297/DIG. 2; 297/DIG. 9
[58] Field of Search ............... 297/195, 208, 209, 301, 297/302, 303, DIG. 9, DIG. 2

[56] References Cited

U.S. PATENT DOCUMENTS

| 3,377,084 | 4/1968 | Musichuk | 297/195 X |
| 3,698,763 | 10/1972 | Worley | 297/208 X |
| 4,141,587 | 2/1979 | Holcomb | 297/195 |
| 4,231,611 | 11/1980 | Bird | 297/195 |

FOREIGN PATENT DOCUMENTS

| 77079 | 1/1954 | Denmark | 297/208 |
| 594294 | 3/1934 | Fed. Rep. of Germany | 297/208 |
| 2506468 | 8/1976 | Fed. Rep. of Germany | 297/195 |

Primary Examiner—William E. Lyddane
Assistant Examiner—Peter R. Brown
Attorney, Agent, or Firm—Wm. Jacquet Gribble

[57] ABSTRACT

A cycle seat with a back is moulded of either plastic or metal material and is fixed to a conventional cycle seat post with a standard racheting clamp and an unique spring cradle. The cradle accepts a horizontal pivot bolt journalled in the forward portion of the cradle and secured in spaced rails on the seat bottom. A spring bears against the seat bottom from a spring cup of the spring cradle, biasing the front contacts or limbs of the cradle against the seat bottom in front of the pivot bolt.

The seat rails and the cradle may have other rail and cradle apertures or slots to adjust the seat and cradle horizontally with respect to the seat mount post of the cycle. If the seat is of moulded plastic a metal shell with side rails and matching apertures may be positioned between the seat bottom and the cradle and its spring.

4 Claims, 8 Drawing Figures

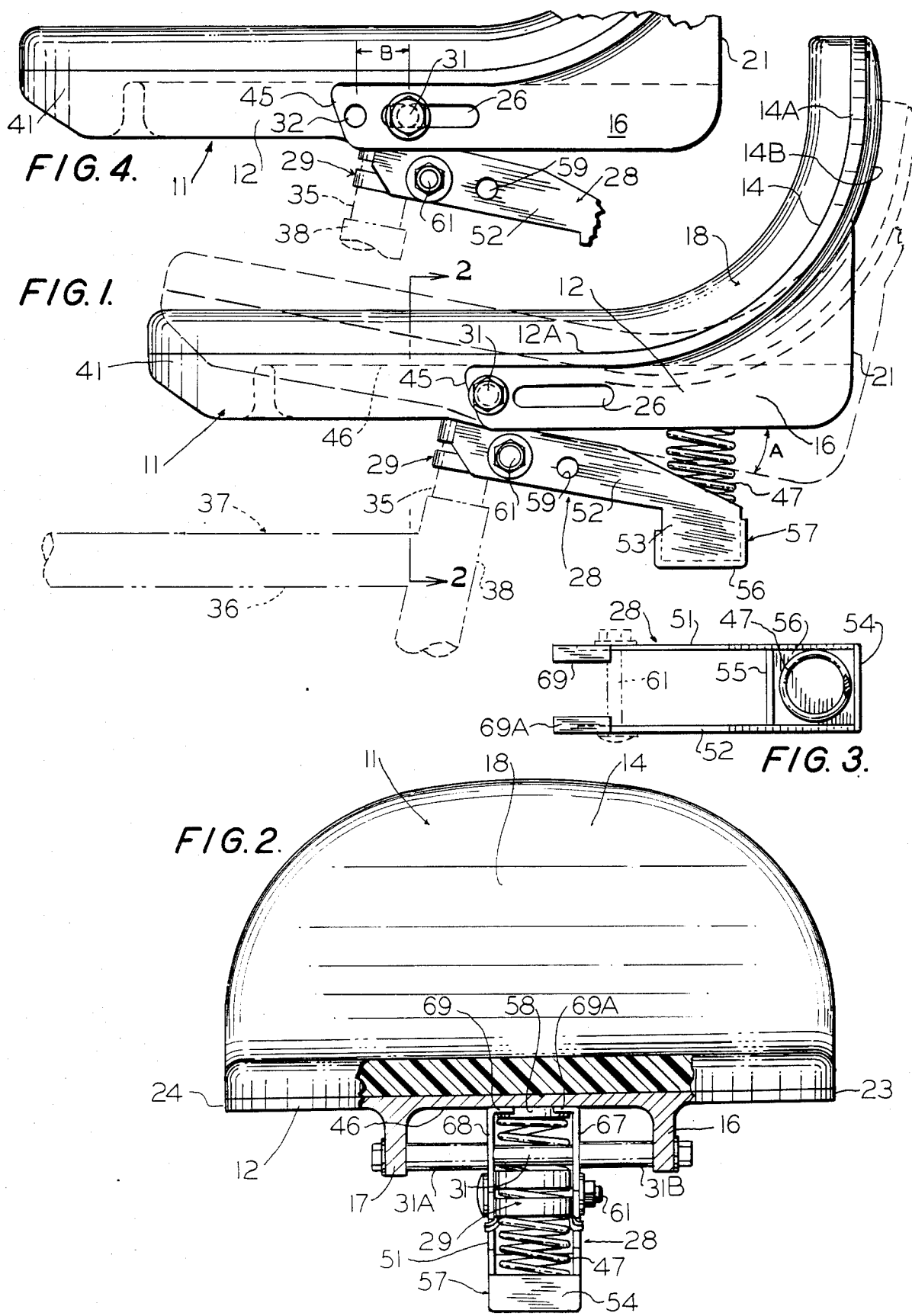

PIVOT MOUNTED CYCLE SEAT WITH SPRING CRADLE

BACKGROUND OF THE INVENTION

The invention relates to seats for manual or power cycles and more particularly to seats with thrust backs mounted on vertical seat posts of a cycle. The field of the invention is exemplified by previous patents to co-inventor Holcomb U.S. Pat. No. 3,970,345 issued July 20, 1976 and U.S. Pat. No. 4,141,587 issued Feb. 27, 1979. Each of these cited patents is concerned with cycle seats with upturned seat backs for added thrust for pedalists and added comfort for power cyclists, but each shows contoured seat perimeters to eliminate chafing and provide adequate buttocks support. Now, we have invented apparatus comprising a seat and seat mount that not only provides comfort and thrust efficiency, but also supplies a degree of sprung comfort and adjustability for comfort unattained in prior art devices of this nature, without interference with attachment of cargo carrying apparatus. The inventive seat is capable of fore and aft adjustment to suit long or short legged riders and allows full use of the vertical adjustment inherent in the conventional seat mounting post of bicycles, mopeds and other light-powered cycles. The added comfort is not arrived at at the expense of performance of experts and adds to the enjoyment of casual riders without teaching bad riding habits.

SUMMARY OF THE INVENTION

The invention contemplates a seat for conventional cycles with upwardly protruding seat posts and rachet post clamps with a securing bolt and comprises a seat with a seat base joined to a vertical backrest and transversely spaced seat bottom rails with longitudinally spaced apertures though the rails. The apertures can accept the pivot bolt and also afford attachment means for a metal shell used with seats of plastic. Aft apertures may afford means for attaching cargo apparatus to the seat. A spring cradle with an aft spring cup has spaced side bars extending from the cup forward to limbs that have feet to bear against the under side of the seat or its shell. Horizontally aligned apertures in the side bars receive the securing bolt of the seat post clamp to fix the clamp and the cradle with respect to the cycle seat post. Horizontally aligned apertures in the forward limbs accept the pivot bolt as it extends transversely through matched apertures in the side rails of the seat. A compression spring based in the cradle cup aft of the pivot bolt extends to the under side of the seat between the rails. As the rider applies stress to the rear of the seat either from pumping motion on the pedals or from road shocks, the seat pivots about the pivot bolt against the spring to the extent permitted by the spring loading, cushioning all seat motion to the advantage of the rider.

Several of the conventional seat post clamps are adapted to use with the apparatus of the invention, but the presently preferred clamp is one made to clamp two different post diameters, a clamp that may be turned about its clamping bolt to change fore and aft location of the larger or smaller clamping loop. The spring may be changed to alter the spring load to suit the rider's weight or technique and the seat accommodates to any cycle with an upwardly extending mounting post. These and other advantages of the invention are apparent from the following detailed description and drawing.

BRIEF DESCRIPTION OF THE DRAWING

FIG. 1 is a left side elevational view of a cycle seat in accordance with our invention;

FIG. 2 is a transverse sectional elevational view taken along line 2—2 of FIG. 1;

FIG. 3 is a top plan view of the spring cradle with the position of the sring shown therein;

FIG. 4 is a fragmentary left side elevational view of the apparatus of FIG. 1 in an alternate mounting arrangement;

In each of the views like elements are identified by like numerals.

DESCRIPTION OF THE PREFERRED EMBODIMENTS

Figure 5:
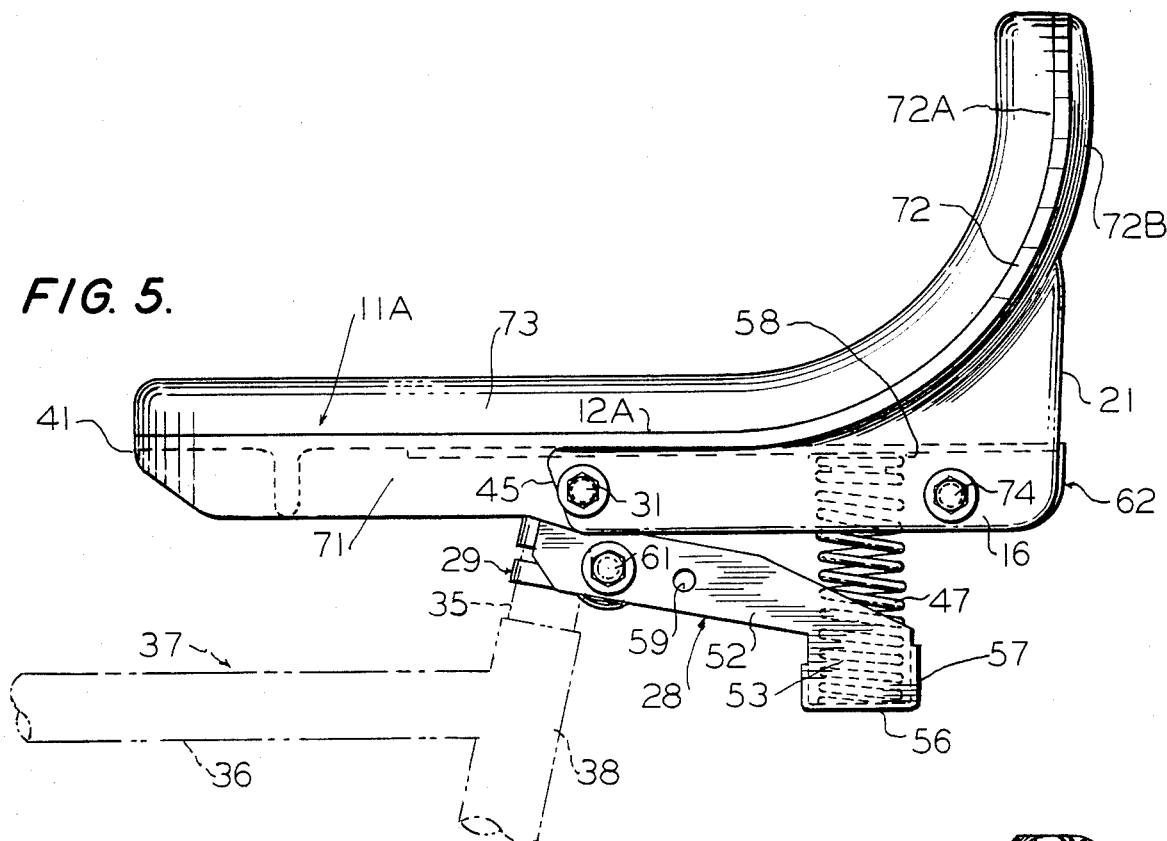
FIG. 5 is a left side elevational view of an alternate embodiment of the invention.

In the embodiment of FIGS. 1 through 4 a seat 11 in accordance with the invention has a seat base 12 from which a seat back 14 rises and from which bottom side rails 16 and 17 depend. A seat pad 18 is adhered to the upper surface 12A of the seat base and upper surface 14A of the seat back. The back is concave where it meets the pad and of substantially uniform thickness so that a convex portion 14B is apparent in FIG. 1. The bottom side rails 16, 17 extend rearwardly to an aft end 21 which extends upwardly to fair into the convex area 14B of the back 14. As can be seen from FIG. 2, the rails 16 and 17 are transversely spaced centrally of the broad area of seat base 12 inboard of the outer edges 23, 24 thereof. The seat pad 18 is substantially the same in perimetral configuration as the seat base and back may be of any suitable resilient material such as foam plastic or rubber. Ideally any such material will have an outer skin to resist sun and water.

Again referring to FIG. 1, an elongate aperture or slot 26 in each of the side rails affords means for attaching the spring cradle 28 and a conventional seat post clamp 29 to the seat itself. Attachment is by means of a pivot bolt 31 which, in FIG. 1, extends through a forward aperture 32 (see FIG. 4) of each rail. The aperture and bolt position of FIG. 1 represents extreme rearward positioning of the seat 11 with respect to conventional seat post 35 of a cycle 36 whose upper frame member 37 and post socket 38 are all shown in phantom lines in FIGS. 1 and 4.

Figure 8:
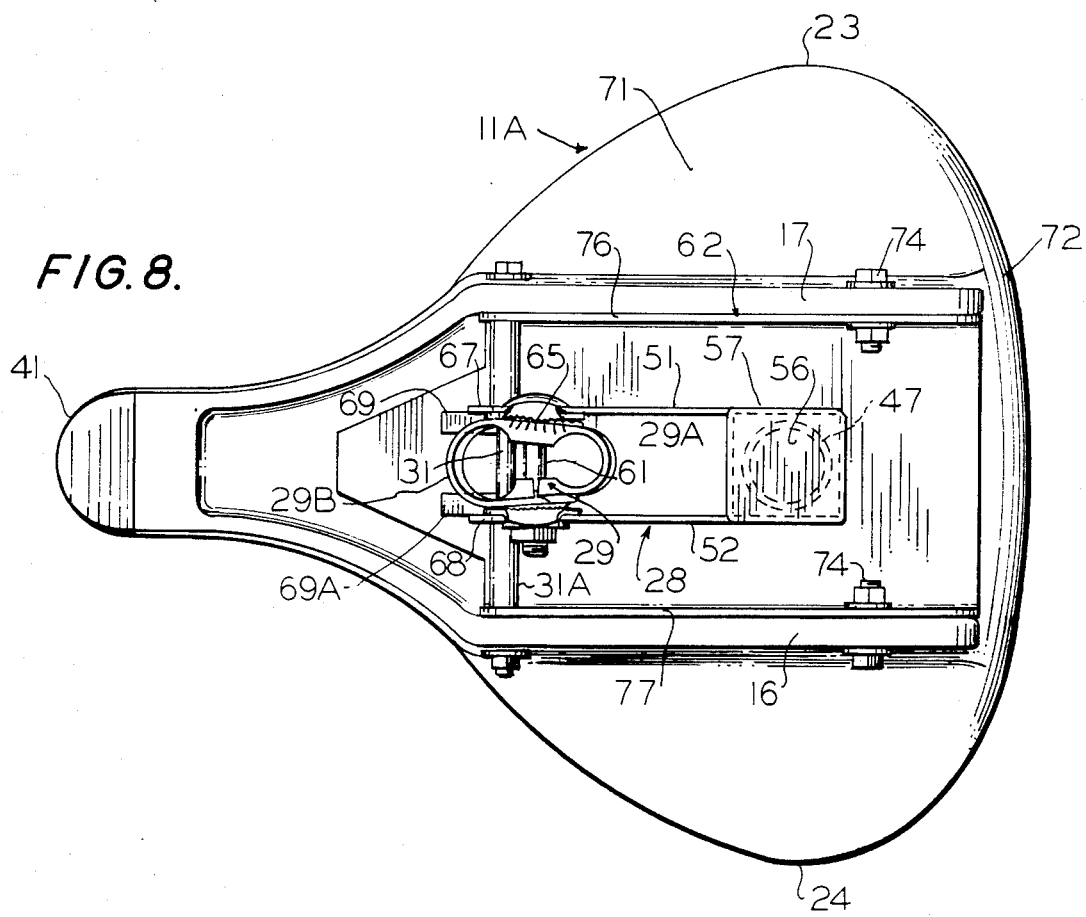
FIG. 8 is a bottom plan view of the embodiment of FIG. 5.

As is apparent from the FIG. 8 bottom plan of the similar alternate embodiment, the seat base tapers to a narrow front 41 in both the embodiment of FIG. 5 and that of FIG. 1. The seat bases are broad near the rise of the back 14 to afford full support to the buttocks of the rider but because of the tapered configuration gives clearance for the inner thigh to move past the seat base edge in the pumping motion of a pedalled cycle. The broadest points of the seat base 12 are indicated at 23 and 24 in FIG. 2, while the narrow front portion is shown at 41 in FIGS. 1 and 4 of the first embodiment. The seat base tapers from a diagonally vertical line 45 toward the narrow front 41, the line 45 indicating the forward portion of the side rails 16, 17. The depth of the rails below the bottom surface 46 of the seat base depends in part on the seat material and whether or not a metal shell such as the shell 62 of the embodiment of FIG. 5 is used with a plastic moulded seat. The strength of the material of course determines how thick the rail must be below the aperture 32 and the elongate aperture 26 to give sufficient strength to resist the strain imposed by riders of varying weights and the rocking moment of the seat against the spring bias of a compression spring 47.

Figure 6:
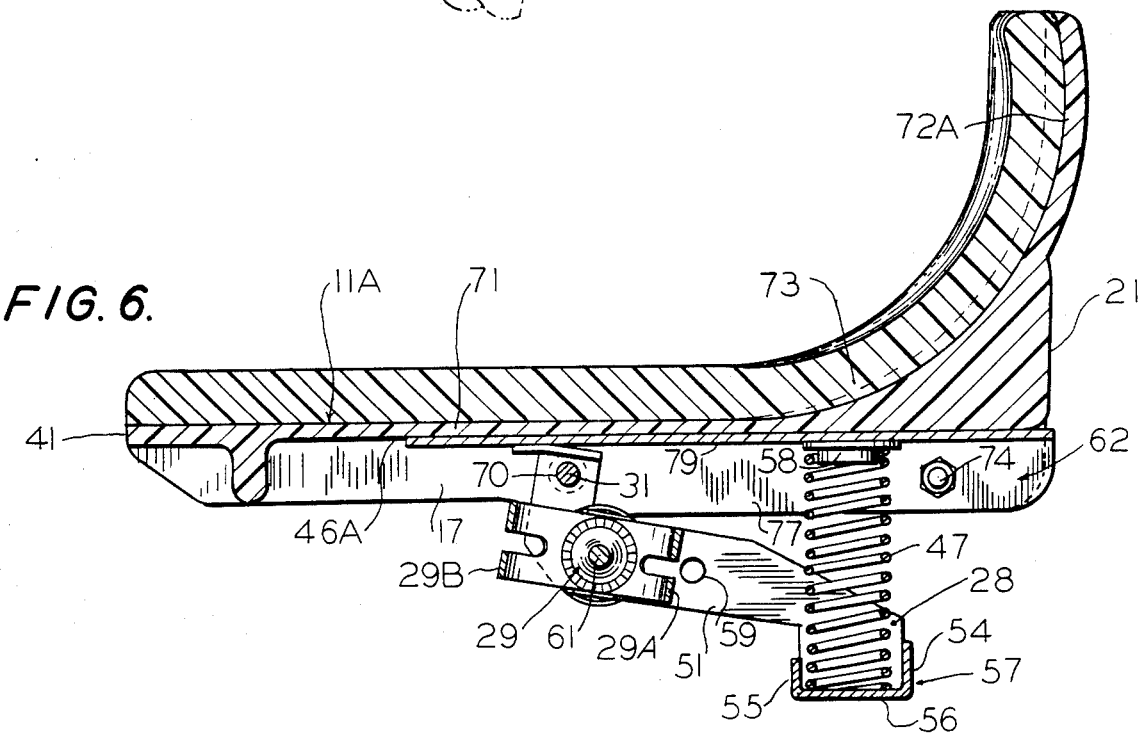
FIG. 6 is a longitudinal sectional elevational view of the embodiment of FIG. 5.
Figure 7:
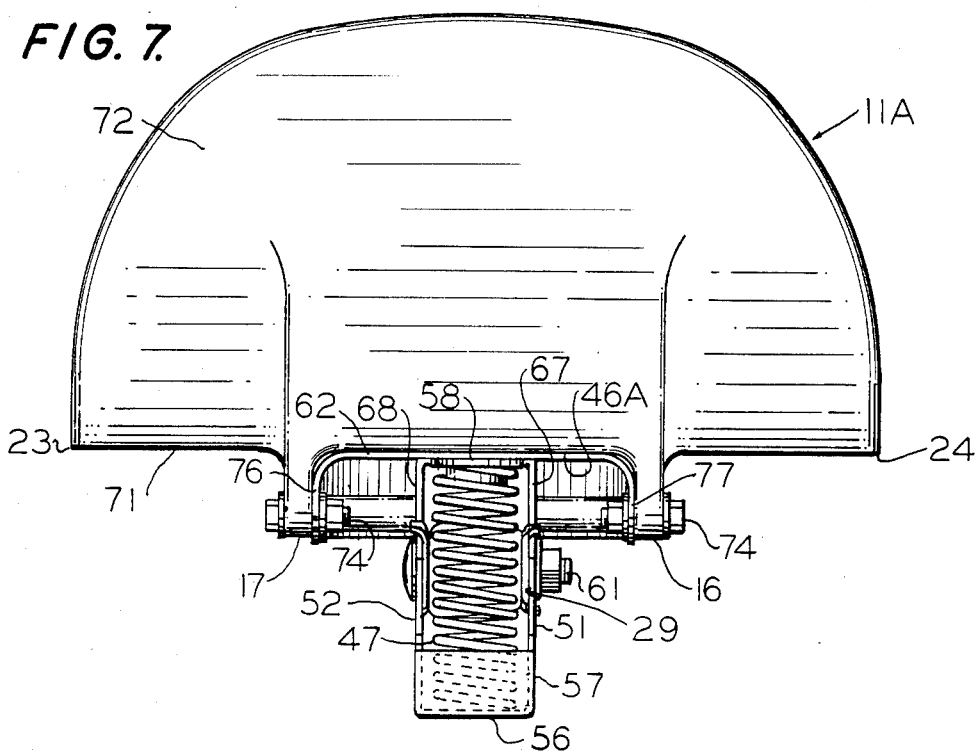
FIG. 7 is a rear elevational view of the embodiment of FIG. 5.

Spring cradle 28 is shown in plan in FIG. 3 wherein the cradle 28 is seen to have side bars 51 and 52 transversely spaced and depending aft in a cup side 53 on each bar. Transverse end wall 54 connects the cup sides as does an intermediate wall 55. Together with a floor 56 they define a spring cup 57 in which the lower end of compression spring 47 seats. The upper end of the spring has a wear pad 58 of cylindrical shape, which fits into the top turn of the spring and is a buffer between the hard end of the spring and the under side of the seat base 12. The pad is best seen in the sectional elevation of FIG. 6, the use of the pad being the same in both illustrative embodiments. The pad is usually of Teflon and may be of other like non-abrasive materials well known in the art.

Side bars 51, 52 of the spring cradle extend forwardly from the cup to a pair of longitudinally spaced apertures, one of which apertures, 59, is seen in FIGS. 1 and 4. Clamping bolt 61 seats in the other, more forward aperture pair, in those Figures, but may be seated in aperture 59 to change the fore to aft position of the seat with respect to the seat post, as desired by the rider.

Clamp 29 is a conventional bicycle seat post clamp such as that made by the Faulhaber Division of Persons-Majestic Manufacturing Company and is a standard double loop clamp to accommodate to either of the conventional post diameters for bicycles. The clamp, as seen in FIG. 8, has two loops 29A, 29B, the 29B loop being the larger and the one shown fixed to the seat post 35 in the embodiments of FIG. 1 and FIG. 5. By loosening the nut on bolt 61 the clamp loop may be rotated about the bolt and thus reverse the relationship of the desired loop with respect to the seat post to change the fore to aft position of the seat with respect to the post. The conventional rachet or friction grip elements shown generally at 65 provide for adjusting the tilt of the seat with respect to upper frame member 37 of the cycle as desired.

The spring cradle has forward limbs 67 and 68 with feet 69, 69A, respectively, integrally formed with side bars 51, 52. The limbs and feet act to establish the relationship of the seat to the cradle by the contact of the feet against the underside 46 of the seat base to limit the tilt of the seat about the pivot bolt 31 when the weight on the seat moves the narrow end 41 toward upper frame member 37. Since the pivot bolt passes through the cradle limbs 67, 68 by way of limb apertures 70 and the feet contact the seat base bottom forward of the pivot bolt, the forward tilt of the seat is thereby controlled by the limb extension above the pivot bolt. The backward tilt of the seat, which gives the cushioning effect to the seat, is against the spring load of compression spring 47 and the degree or angle "A" of tilt is dependent upon the force applied by the rider's weight, either as a result of pedalling motion or from displacement of the weight due to rough travel surface acting upon the compression spring. The spring may be changed as ride conditions change, both stiffer and "softer" springs being readily available.

In order to preclude transverse displacement of the cradle with respect to the center of the seat base, pivot bolt 31 has tubular spacers 31A, 31B, placed between the side rails and the cradle side bars 51, 52. With the seat post clamp secured to the seat post and the spring cradle secured to the seat post clamp, the orientation between the seat post and the seat is determined by the particular aperture in which pivot bolt 31 resides. In FIG. 1 the pivot bolt resides in forward rail aperture 32, but in FIG. 4 the pivot bolt 31 resides in elongate aperture 26. The relative position of the seat 11 is farther forward with respect to post 35 in FIG. 1 than it is in FIG. 4 and, as is evident from an inspection of FIG. 4, the seat is capable of further forward adjustment determined by the length of the aperture.

As mentioned before, further adjustment can be accomplished by rotation of the Faulhaber type post clamp about the clamping bolt or by moving the clamping bolt aft to aperture 59 of cradle bars 51, 52.

Each of these adjustments is easily made with basic tools common to cyclists and the seat of the invention may thus be fitted to the particular desires of any rider.

The advantages recited for the embodiment of FIG. 1 are also applicable to the embodiment of FIG. 5, the principal distinctiveness of the FIG. 5 embodiment residing in the protective shell 62 which enables the seat 11A to be of moulded plastic. Seat base 71 and seat back 72 are integrally moulded and receive a seat pad 73 in the same configuration described with respect to the embodiment of FIG. 1. Seat 11A also has transversely spaced parallel side rails 16 and 17, as can be seen in FIGS. 5–8. Shell 62 is seen to have a U-shaped transverse configuration in FIG. 7 where it resides between the side rails 16, 17 and is held in contact with bottom side 46A of the seat base 71 by a pair of bolts 74 through each side rail and the pivot bolt 31, which passes not only through the apertures of the side rails 16 and 17, but also through the depending side walls 76, 77 of the metallic shell 62. The pivot bolt also passes through the forward apertures 70 of the spring cradle limbs 67, 68, such that the cradle feet 69, 69A, register in contact with the under surface 90 of shell 62 in the same way that the cradle feet registered against the under surface 46 of the seat base 12 of the embodiment of FIG. 1. The upper pad 58 of compression spring 47 is thrust by the spring against the bottom surface 79 of shell 62, and the spring bias is thus distributed from the floor 56 of cradle cup 57 in the same manner as in the embodiment of FIG. 1.

Shell bolts 74 at the back of the seat 11A may be used to mount cargo apparatus to the seat through the apertures in the seat rails through which the bolts 74 pass. Similarly, the seat 11 of FIG. 1 can be provided with similar rear apertures for the same purpose. Also, while not shown in the embodiment of FIG. 5, slots or elongate apertures like aperture 26 of FIG. 1 may be placed in the FIG. 5 embodiment for the purposes set forth with respect to the FIG. 1 embodiment.

While several embodiments have been shown or described in the foregoing specification and accompanying drawing, it is to be understood that the specification and drawing are illustrative only, the invention being defined by the claims, since other variations than those disclosed herein may occur to the persons skilled in this art within the scope of the claims.

We claim:

1. In a cycle seat for conventional cycles with upwardly protruding seat attachment posts and conventional seat post clamps having a securing bolt the combination comprising a seat base, a seat back rising from the seat base, transversely spaced, parallel rails depending from the bottom of the seat base, each rail having fore and aft portions and each rail further having transverse walls defining apertures through the rail at longitudinally spaced intervals along the rails both fore and aft on the rail; a transverse pivot bolt lodged in transverse apertures of the parallel rails in the fore portion thereof, a central compression spring freely bearing against the seat base aft of the pivot bolt, a spring cradle secured in a fixed position with respect to the seat post by said seat post clamp, forward stops on the cradle adapted to register against the bottom of the seat base, a central aft spring cradle cup adapted to freely receive the lower end of the compression spring, said seat base having a perimeter transversely broader aft than forward.

2. Apparatus in accordance with claim 1 further comprising a shell secured to the bottom of the seat base between the seat base rails, depending side walls on the shell parallel to said rails, and walls in said side walls defining transverse apertures coinciding with the defined apertures in the seat base rails.

3. Apparatus in accordance with claim 1 wherein said spring cradle comprises side bars fixed to said spring cup and extending forward to include said forward stops, each stop comprising a limb extending from a bar upwardly toward said seat base bottom, limb walls defining an aperture in each limb adapted to receive said pivot bolt, each limb further having a seat bottom contact foot normal to said limb.

4. Apparatus in accordance with claim 3 wherein each side bar further comprises transverse walls defining transversely aligned apertures in the side bars adjacent the limbs and transverse walls defining transversely aligned apertures between the cup and the limb.

* * * * *